United States Patent
Mohamad Jembari et al.

(10) Patent No.: US 9,975,588 B2
(45) Date of Patent: May 22, 2018

(54) FIFTH WHEEL COUPLER SAFETY CONTROL SYSTEM

(71) Applicant: SAF-HOLLAND, Inc., Holland, MI (US)

(72) Inventors: Ahmad Nizam Mohamad Jembari, Grand Haven, MI (US); Gerald W. Hungerink, Holland, MI (US); Brian E. Ainsworth, Ada, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 64 days.

(21) Appl. No.: 15/128,518

(22) PCT Filed: Mar. 24, 2015

(86) PCT No.: PCT/US2015/022131
§ 371 (c)(1),
(2) Date: Sep. 23, 2016

(87) PCT Pub. No.: WO2015/148438
PCT Pub. Date: Oct. 1, 2015

(65) Prior Publication Data
US 2017/0174275 A1    Jun. 22, 2017

Related U.S. Application Data

(60) Provisional application No. 61/969,532, filed on Mar. 24, 2014.

(51) Int. Cl.
*B62D 53/08* (2006.01)
*B62D 53/12* (2006.01)
(Continued)

(52) U.S. Cl.
CPC ............. *B62D 53/08* (2013.01); *B60D 1/015* (2013.01); *B60T 7/20* (2013.01); *B62D 53/12* (2013.01); *B60K 35/00* (2013.01)

(58) Field of Classification Search
CPC ........ B62D 53/08; B62D 53/12; B60D 1/015; B60T 7/20; B60K 35/00
See application file for complete search history.

(56) References Cited

U.S. PATENT DOCUMENTS 5,069,472 A    12/1991 Parr et al.
5,806,937 A    9/1998 Brunson
(Continued)

FOREIGN PATENT DOCUMENTS

EP    1295783    3/2003

OTHER PUBLICATIONS

The Hague; Supplementary European Search Report; dated Sep. 18, 2017.

*Primary Examiner* — Tony H Winner
*Assistant Examiner* — Marlon A Arce
(74) *Attorney, Agent, or Firm* — Price Heneveld LLP

(57) ABSTRACT

A trailer hitch arrangement control system including a trailer sensor for sensing the position of a trailer relative to a trailer hitch assembly, a lock sensor for sensing the position of a locking mechanism, a control valve in fluid communication with a brake assembly of a trailer and operable between closed and open positions, wherein the brake assembly is engaged and disengaged, respectively, and wherein the brake assembly is positively biased toward the engaged position, and a controller coupled to the trailer sensor, the lock sensor and the control valve for determining whether the trailer hitch assembly is properly coupled to the hitch and generating a control signal to the control valve to actuate the control valve from the open position to the closed position when the trailer hitch assembly is improperly coupled to the hitch, such that the brake assembly remains in the engaged position.

19 Claims, 3 Drawing Sheets

(51) Int. Cl.
   *B60T 7/20*     (2006.01)
   *B60D 1/01*     (2006.01)
   *B60K 35/00*     (2006.01)

(56) References Cited

U.S. PATENT DOCUMENTS

| | | | |
|---|---|---|---|
| 5,861,802 A | 1/1999 | Hungerink et al. | |
| 6,285,278 B1 | 9/2001 | Schutt et al. | |
| 6,452,485 B1 * | 9/2002 | Schutt | B62D 53/0828 |
| | | | 280/435 |
| 9,027,949 B2 * | 5/2015 | Reimer | B60D 1/015 |
| | | | 280/432 |
| 9,650,030 B2 * | 5/2017 | Nagura | B60T 17/22 |
| 2004/0017285 A1 | 1/2004 | Zielinski et al. | |
| 2011/0025482 A1 * | 2/2011 | Alguera | B60D 1/62 |
| | | | 340/431 |
| 2011/0147142 A1 | 6/2011 | Standen | |
| 2013/0028999 A1 | 1/2013 | Thewes et al. | |

* cited by examiner

FIFTH WHEEL COUPLER SAFETY CONTROL SYSTEM

BACKGROUND OF THE INVENTION

The present invention generally relates to a fifth wheel coupler safety control system, and in particular, a system for controlling a coupling system of a fifth wheel trailer hitch and providing or relaying status information relating to the coupling status of the hitch to a vehicle operator.

SUMMARY OF THE INVENTION

One aspect of the present invention is to provide a trailer hitch arrangement control system for monitoring a trailer hitch assembly and having a hitch receiver for receiving a hitch of a trailer and a locking mechanism for locking the hitch within the hitch receiver, the system determining whether the hitch is properly coupled to the trailer hitch assembly, the system comprising a trailer sensor for sensing the position of the trailer relative to the trailer hitch assembly, and a lock sensor for sensing the position of the locking mechanism. The system further comprises a control valve in fluid communication with a brake assembly of the trailer, the control valve being operable between a closed position, wherein the brake assembly is in an engaged position, and an open position, wherein a pressurized fluid is supplied to the brake assembly and the brake assembly is in a disengaged position, and wherein the brake assembly is positively biased from the disengaged position toward the engaged position. The system further comprises a controller coupled to the trailer sensor, the lock sensor and the control valve for determining whether the trailer hitch assembly is properly coupled to the hitch and generating a control signal to the control valve to actuate the control valve from the open position to the closed position when the trailer hitch assembly is improperly coupled to the hitch, such that the brake assembly remains in the engaged position.

The principal objects of the present invention are to provide a trailer hitch arrangement control system that prevents an operator from moving a towed vehicle unless a proper coupling status is reached by requiring that the brakes of the towed vehicle remain locked until a satisfactory coupling status is reached. The present invention results in an overall reduced operating cost by reducing or eliminating damage to towed vehicles, towing vehicles, and products located within the towed vehicles caused by accidents relating to faulty or inadequate couple between the towing and towed vehicles, provides important feedback information to the vehicle operator, and is particularly well adapted for the proposed use.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
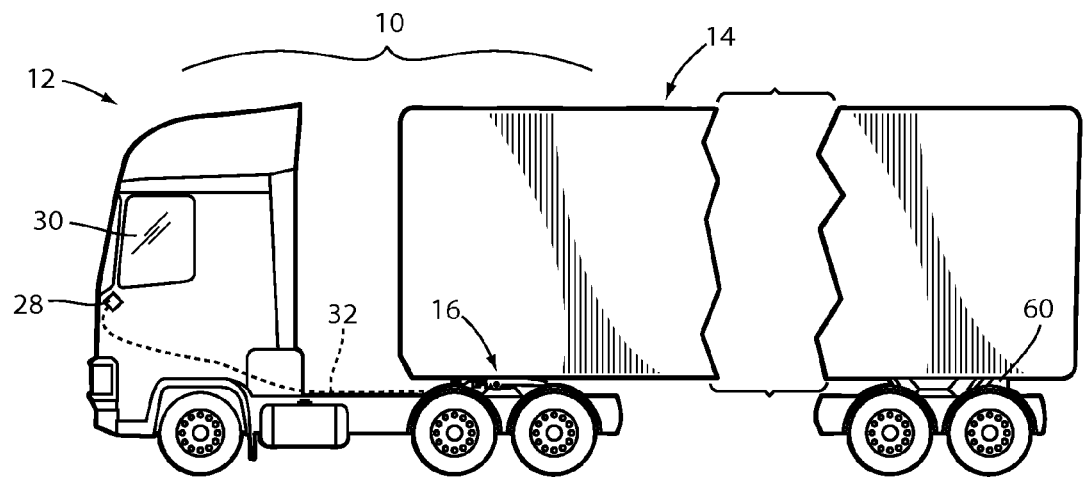
FIG. 1 is a side view of a tractor-trailer combination, wherein the combination is in a coupled state.
Figure 3:
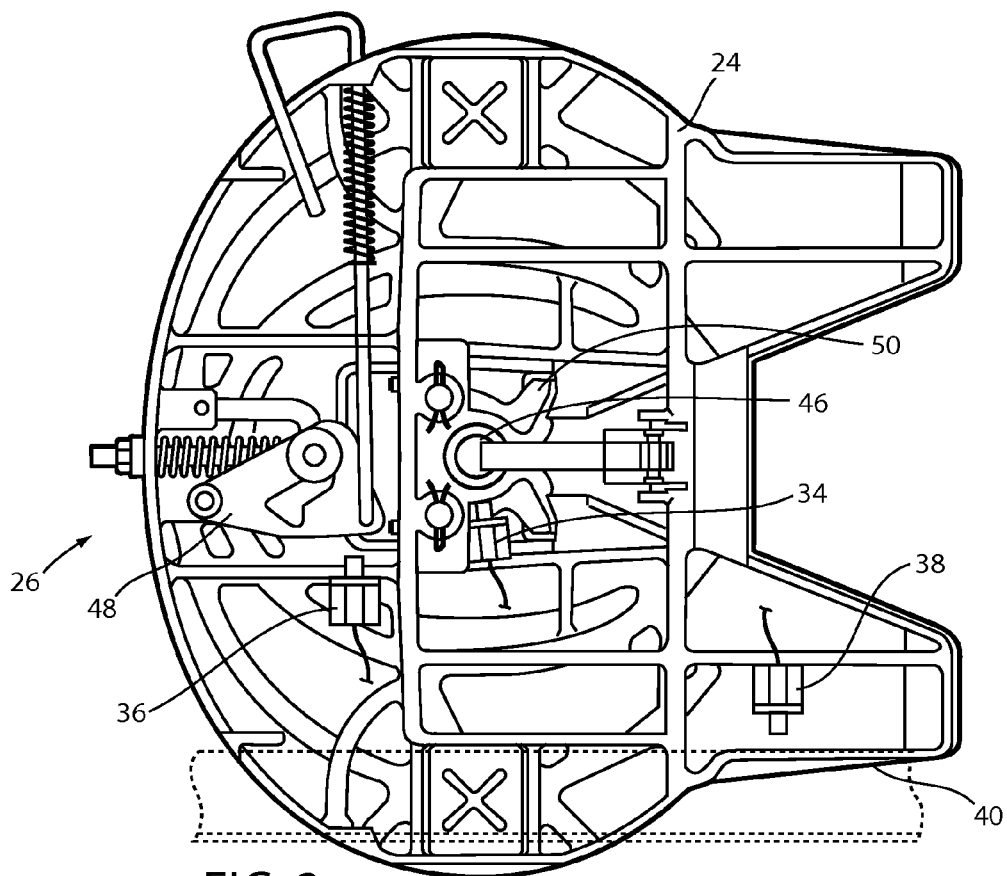
FIG. 3 is a bottom view of a fifth wheel hitch assembly.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
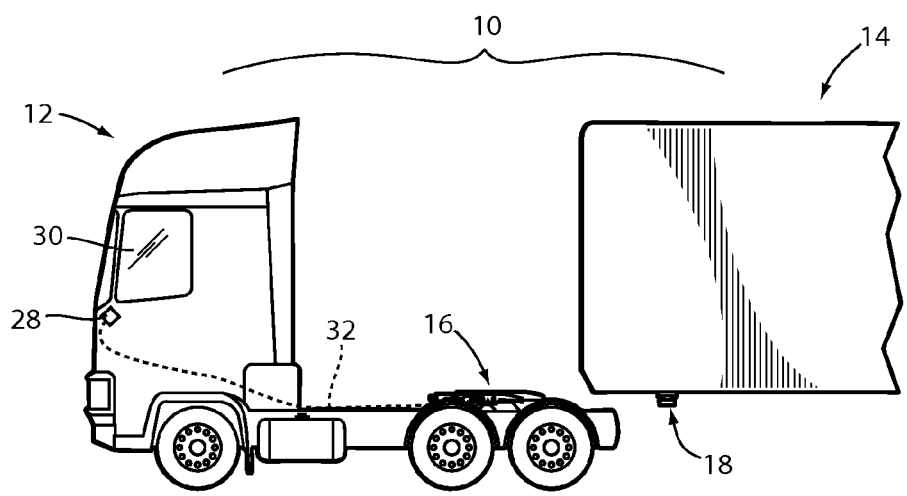
FIG. 2 is a side elevational view of the tractor-trailer combination of FIG. 1, wherein the combination is in an uncoupled state.

The reference numeral 10 (FIGS. 1 and 2) generally designates a tractor-trailer combination, wherein a tractor 12 represents a towing vehicle and a trailer 14 represents a towed vehicle. The tractor 12 includes a trailer hitch assembly generally represented by a fifth wheel hitch assembly 16, while the trailer 14 includes a hitch generally represented by a kingpin 18. The fifth wheel hitch assembly 16 includes a base 20 securely mounted on a frame member 22 of the tractor 12, a fifth wheel hitch plate 24 pivotally mounted to the base 20 on a transverse axis, and a locking mechanism 26 for locking the kingpin 18 in place. The fifth wheel coupler safety control system preferably includes a plurality of sensors mounted to the fifth wheel hitch assembly 16, and a status indicating device or visual interface generally represented by a dashboard display 28 mounted in the interior of a cab 30 of the tractor 12, whereby the sensors are coupled to the status indicating device by a cable 32. Preferably, the sensors mounted to the hitch assembly 16 include a kingpin sensor 34 and a lock sensor 36. Alternatively, a trailer proximity sensor such as a trailer plate movement sensor 38 may also be utilized. In the illustrated example, the sensors 34, 36, 38 include non-contact inductive sensors, however, other suitable sensors known in the art may also be utilized. Although the hitch plate movement sensor 38 is described hereinafter as a hitch plate movement sensor, the movement sensor 38 could be mounted in other locations so long as the sensor 38 still detects the proximity of the trailer 14 to the hitch assembly 16.

Figure 4:
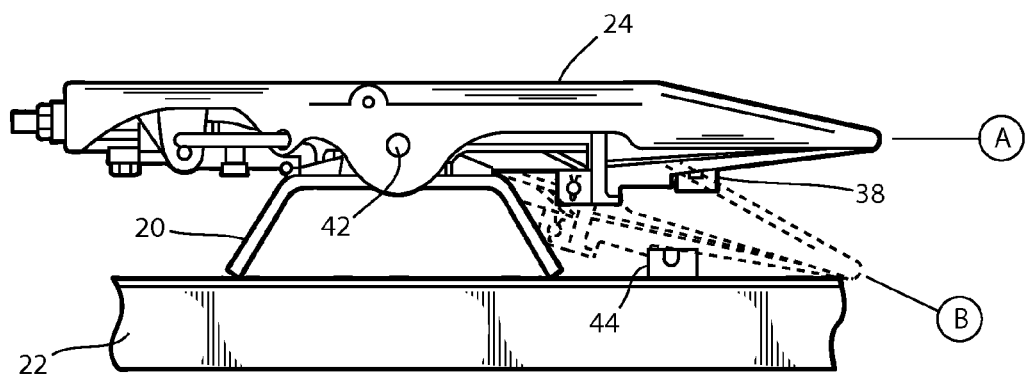
FIG. 4 is a side elevational view of the hitch assembly of FIG. 3.

FIG. 3 illustrates a bottom view of an exemplary fifth wheel hitch plate 24, wherein the hitch plate movement sensor 38 is mounted on a flange 40 of the hitch plate 24 such that the sensing end of the sensor 38 faces outward in a direction perpendicular to the pivot pins 42 (FIG. 4) of the hitch plate 24. FIG. 4 illustrates the hitch plate 24 from the side in combination with the base 20 in a coupled horizontal position A and in an uncoupled at-rest position B (in dashed lines). By mounting a metal plate 44 on the chassis 22 in a position near where the sensing end of the sensor 38 is disposed when the hitch plate 24 is in the resting position B, the hitch plate movement sensor 38 detects the presence of the plate 44 as a basis for determining that the hitch plate is in a tilted at rest position. When the tractor 12 is backed under the trailer 14, contact is made between the tilted hitch plate and a portion of the trailer 14. This contact causes the hitch plate 24 to rotate into a coupled position. When the sensor 38 subsequently detects the absence of the plate 44, it can be concluded that the hitch plate 24 has been moved from its at-rest position and that the trailer 14 is in proximity to the hitch assembly 16. It is noted that the sensor 38 may also be mounted so as to detect metal when the hitch plate 24 is in the horizontal coupled position.

Figure 5:
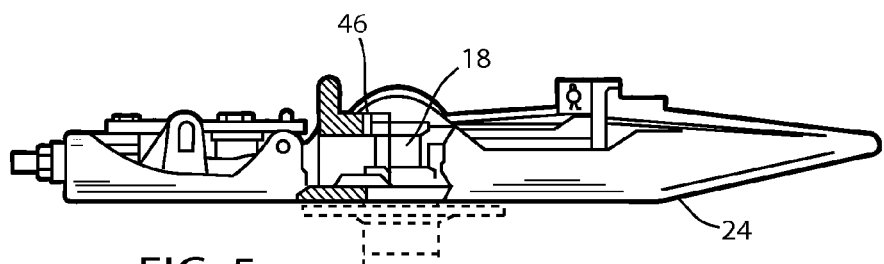
FIG. 5 is a side view in partial cross-section of the hitch assembly as shown in FIG. 3.

The kingpin sensor 34 is mounted to the hitch plate 24 with its sensing end near the throat 46 formed in the hitch plate 24 into which the trailer kingpin 18 is positioned and locked. FIG. 5 illustrates an upside-down side view in partial cross-section illustrating the location of the kingpin 18 when properly disposed within the throat 46. As constructed, the kingpin sensor 34 outputs a detection signal when the metal lower flange of the kingpin 18 is disposed in the throat 46.

The fifth wheel hitch assembly 16 further includes the locking mechanism 26 that is biased by compression springs to automatically lock in and secure the trailer kingpin 18 as soon as it enters the throat 46. In the example illustrated in FIG. 3, the lock sensor 36 is mounted on the hitch plate 24 such that its sensing end is positioned proximate to a position that a metal plate 48 of the locking mechanism 26 is in when in a locked position. In this manner, the lock sensor 36 detects the presence of the plate 48 as a basis for detecting that the locking mechanism 26 is in a locked and secured position. Although a particular locking mechanism is illustrated in FIG. 3, it will be appreciated by those skilled in the art, that the present invention may be used in connection with any type of locking mechanism, and that the lock sensor 36 may be positioned so as to sense the relative position of other components of the illustrated locking mechanism 26, such as locking jaws 50, and the cam member or members that actuate the same. It should also be noted that the present invention may be applied to hitch assemblies having other constructions and is not limited to a fifth wheel hitch assembly and the mounting locations exemplified thereby.

Figure 6:
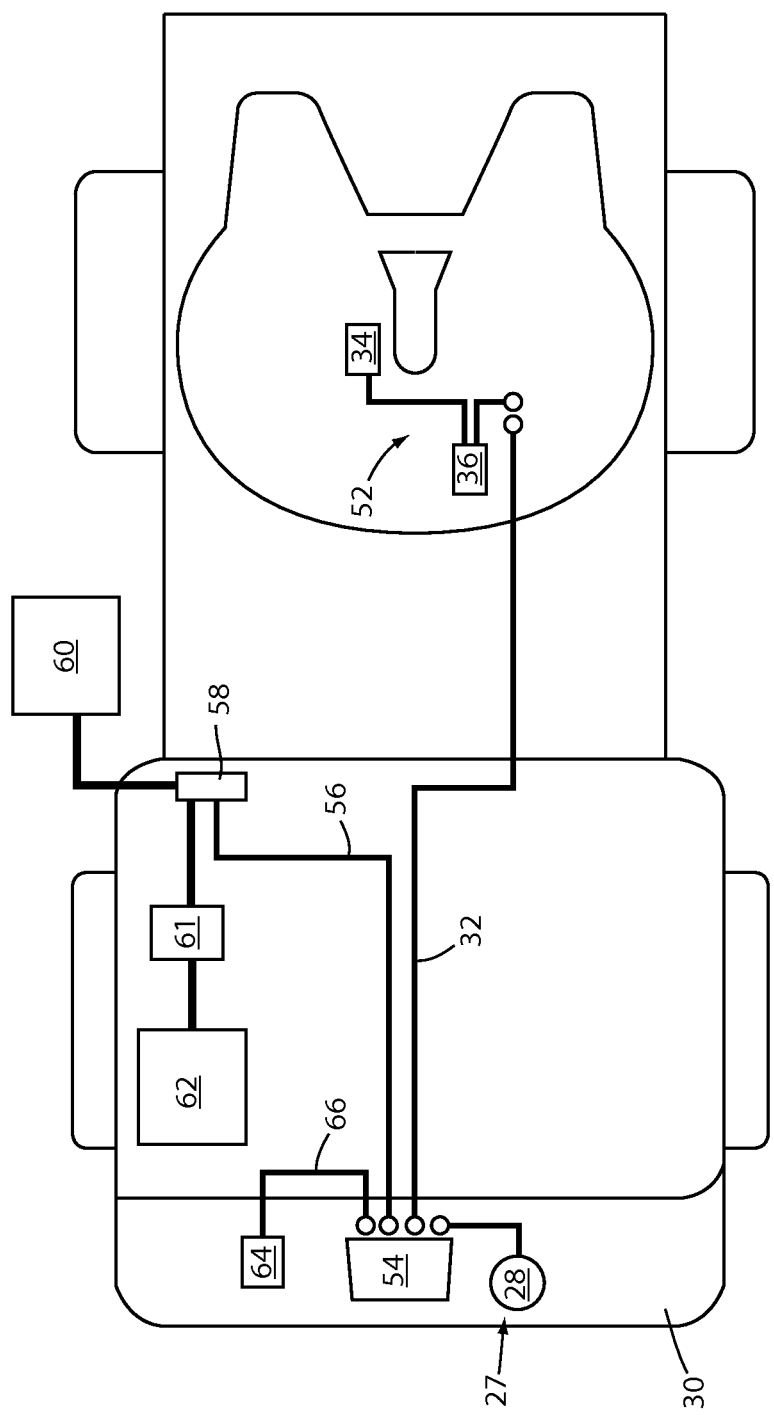
FIG. 6 is a schematic view of a fifth wheel coupler safety control system embodying the present invention.

As schematically represented in FIG. 6, the fifth wheel coupler safety control system of the present invention includes a fifth wheel sensor harness assembly 52 that includes the kingpin sensor 34 and the lock sensor 36. Although not illustrated in the immediate example, the sensor harness assembly 52 may also include the hitch plate movement sensor 38. Further, the control system may utilize sensor arrays and controls to monitor and control the associated components in a manner as disclosed in Hungerink et al., U.S. Pat. No. 5,861,802, and Schutt et al., U.S. Pat. No. 6,452,485, the disclosures of which are each incorporated herein by reference in their entirety. The sensor harness assembly 52 is coupled to a controller or control module 54 via the cable 32. The controller 54 determines whether the fifth wheel hitch assembly 16 is properly coupled to the kingpin 18 by readings from the sensors 34, 36. The controller 54 is operably coupled via a cable 56 to a control valve generally represented by a solenoid valve 58. The control valve 58 is in fluid communication with a parking or emergency brake assembly 60 (FIGS. 1 and 6) of the trailer 14. The control valve 58 is operable between a closed position, wherein the brake assembly 60 is in an engaged position and prevents the trailer 14 from moving, and an open position, wherein a pressurized fluid such as air is supplied to the brake assembly 60 and the brake assembly 60 is in a disengaged position, thereby allowing the trailer 14 to freely move. The brake assembly 60 is positively biased from the disengaged position toward the engaged position in the manner well known in the art. Although described herein in relation to a parking or emergency brake assembly, the control system of the present invention may also be employed within braking systems of varying configurations.

In operation, an operator positions the tractor 12 relative to the trailer 14 such that the kingpin 18 is received within the throat 46 of the hitch plate 24. The kingpin 18 is then locked within the throat 46 of the hitch plate 24 by the locking mechanism 26, with the kingpin sensor 34 sensing whether the kingpin 18 is properly situated within the throat 24 and the lock sensor 36 sensing whether the locking mechanism 26 has properly locked the kingpin 18 within the throat 46. The operator then exits the cab 30 and connects fluid communication or air supply lines between the tractor 12 and trailer 14, potentially allowing disengagement of the brake assembly 60. The operator returns to the cab 30 and may then attempt to disengage the brake assembly 60 by actuating an operator controlled valve assembly 61 in fluid communication between a pressurized fluid source 62, typically associated with the tractor 12, and the control valve 58. Concurrently, signals are sent from the kingpin sensor 34 and the lock sensor 36 to the controller 54 via the cable 32. Should the controller determine that an improper couple between the fifth wheel hitch assembly 16 and the kingpin 18 has occurred, a control signal is generated by the controller 54 and communicated to the control valve 58 to move the control valve 58 from the open position to the closed position, thereby preventing the pressurized fluid to move from the pressurized fluid source 62 to the brake assembly 60 of the trailer 14, such that the brake assembly 60 remains in the engaged position and prevents the trailer 14 from being moved. Should the controller 54 determine that a proper couple between the hitch assembly 16 and the kingpin 18 has been achieved, the controller 54 does not generate a control signal to the control valve 58, and the control valve 58 remains open, and as a result, the brake assembly 60 of the trailer 14 remains in the disengaged position, thereby allowing the trailer 14 to move.

The system may alternatively include an interface component 27 adapted to communicate the coupling status of the hitch 18 to the hitch assembly 16 to the operator. In the illustrated example, the interface component 27 includes the visual interface or dashboard display 28 to provide visual feedback of the status of the sensing array to the vehicle operator. Specifically, the display 28 can be configured to provide a visual feedback such as a "green" signal to indicate to the operator that a proper couple between the hitch assembly 16 and the kingpin 18 has been achieved, and that the brake assembly 60 of the trailer 14 has been disengaged; a "red" signal to indicate that a proper couple between the hitch assembly 16 and the kingpin 18 has not been achieved, and that the brake assembly 60 of the trailer 14 remains in the engaged position; and, a "yellow" signal to indicate that the overall system is in a ready-to-couple condition and that the operator may attempt to couple the tractor 12 to the trailer 14. Of course, color-coded signals may be replaced by text, other visual indicators, and/or audio signals.

In an additional alternative embodiment, the system may include a manual override input 64 operably coupled to the controller 54 via a cable 66, wherein the override input 64 allows the operator to override the control signal causing the control valve 58 to remain in the closed position. This override signal may be required in order to overcome a faulty sensor array causing the brake assembly 60 of the trailer 14 to remain in an engaged position even when a proper coupling between the hitch assembly 16 and the kingpin 18 has been achieved. Although the override input 64 is illustrated in FIG. 6 as being located within the cab 30 of the tractor 12, it is noted that the override input 64 may be located at a position outside of the cab 30, thereby requiring the operator to exit the cab 30 and promote a visual inspection of the coupling status between the hitch assembly 16 and the kingpin 18 prior to overriding the engaged brake condition.

In the foregoing description, it will be readily appreciated by those skilled in the art that modifications may be made to the invention without departing from the concepts as disclosed herein. Such modifications are to be considered as included in the following claims, unless these claims by their language expressly state otherwise.

The invention claimed is:

1. A trailer hitch arrangement control system for monitoring a trailer hitch assembly having a hitch receiver for receiving a hitch of a trailer and a locking mechanism for locking the hitch within the hitch receiver, the system determining whether the hitch is properly coupled to the trailer hitch assembly, the system comprising:
    a hitch sensor for sensing a position of the hitch relative to the trailer hitch assembly;
    a lock sensor for sensing a position of the locking mechanism;
    a control valve in fluid communication with a brake assembly of the trailer, the control valve operable between a closed position, wherein the brake assembly is in an engaged position, and an open position, wherein a pressurized fluid is supplied to the brake assembly and the brake assembly is in a disengaged position, and wherein the brake assembly is positively biased from the disengaged position toward the engaged position; and
    a controller coupled to the hitch sensor, the lock sensor and the control valve for determining whether the trailer hitch assembly is properly coupled to the hitch and generating a control signal to the control valve to actuate the control valve from the open position to the closed position when the trailer hitch assembly is improperly coupled to the hitch, such that the brake assembly remains in the engaged position.

2. The trailer hitch arrangement control system of claim 1, wherein the hitch receiver includes a fifth wheel hitch plate having a throat, the hitch includes a kingpin, and wherein the hitch sensor is adapted to sense the position of the kingpin relative to the throat of the fifth wheel hitch plate.

3. The trailer hitch arrangement control system of claim 2, wherein the lock sensor is adapted to sense the position of at least one of a locking member and a cam operably coupled to the locking member.

4. The trailer hitch arrangement control system of claim 3, further comprising:
    an interface component coupled to the controller adapted to communicate a coupling status of the hitch to the hitch assembly to an operator.

5. The trailer hitch arrangement control system of claim 4, wherein the interface component comprises a visual interface adapted to display the coupling status to the operator.

6. The trailer hitch arrangement control system of claim 5, wherein the visual interface comprises a dashboard display.

7. The trailer hitch arrangement control system of claim 4, further comprising:
    a manual override input coupled to the controller and adapted to allow the operator to actuate the control valve from the closed position to the open position regardless of the coupling status displayed to the operator.

8. The trailer hitch arrangement control system of claim 7, wherein the interface component is located within the interior of a cab of a towing vehicle, and wherein the manual override input is located on an exterior of the cab.

9. The trailer hitch arrangement control system of claim 8, wherein the control valve comprises a solenoid valve.

10. The trailer hitch arrangement control system of claim 9, wherein the brake assembly comprises a parking brake assembly.

11. The trailer hitch arrangement control system of claim 1, wherein the lock sensor is adapted to sense the position of at least one of a locking member and a cam operably coupled to the locking member.

12. The trailer hitch arrangement control system of claim 1, further comprising:
    an interface component coupled to the controller adapted to communicate a coupling status of the hitch to the hitch assembly to an operator.

13. The trailer hitch arrangement control system of claim 12, wherein the interface component comprises a visual interface adapted to display the coupling status to the operator.

14. The trailer hitch arrangement control system of claim 13, wherein the visual interface comprises a dashboard display.

15. The trailer hitch arrangement control system of claim 1, further comprising:
    a manual override input coupled to the controller and adapted to allow the operator to actuate the control valve from the closed position to the open position.

16. The trailer hitch arrangement control system of claim 1, wherein the control valve comprises a solenoid valve.

17. The trailer hitch arrangement control system of claim 1, further comprising:
    a manual override input coupled to the controller and adapted to allow the operator to actuate the control valve from the closed position to the open position regardless of the coupling status displayed to the operator.

18. The trailer hitch arrangement control system of claim 17, wherein the interface component is located within the interior of a cab of a towing vehicle, and wherein the manual override input is located on an exterior of the cab.

19. The trailer hitch arrangement control system of claim 1, wherein the brake assembly comprises a parking brake assembly.

* * * * *